United States Patent [19]

Carlström

[11] 4,167,953
[45] Sep. 18, 1979

[54] REINFORCED TUBE OF PLASTIC AND A METHOD OF MANUFACTURING THE SAME

[75] Inventor: Börge I. Carlström, Nyhamnslaege, Sweden

[73] Assignee: Hobas Engineering AG, S.A. Ltd., Switzerland

[21] Appl. No.: 680,917

[22] Filed: Apr. 28, 1976

[30] Foreign Application Priority Data

Apr. 28, 1975 [CH] Switzerland ........................... 755442
Nov. 13, 1975 [CH] Switzerland ........................ 7514712

[51] Int. Cl.² .......................... F16L 9/04; F16L 11/11
[52] U.S. Cl. ..................................... 138/133; 138/174
[58] Field of Search ............... 138/133, 137, 174, 141, 138/172

[56] References Cited
U.S. PATENT DOCUMENTS

| 3,338,271 | 8/1967 | Plummer et al. | 138/174 |
| 3,532,132 | 10/1970 | Rubienstein | 138/141 |

Primary Examiner—Robert I. Smith
Attorney, Agent, or Firm—McGlew and Tuttle

[57] ABSTRACT

A reinforced tube or a tubular pipe comprises an inner tubular first layer of glass fiber reinforced plastic, an outer tubular second layer disposed around and spaced radially outwardly from the first layer and also comprising a glass fiber reinforced plastic, and an intermediate filler layer located between the first and second layers and containing plastic and granular filler material which is bonded together and to said first and second layer. In addition a reinforcing insert is embedded in the intermediate filler layer and it comprises a continuous coil wound around the first layer and embedded in the intermediate layer. The coil may comprise a fiber reinforced plastic coil or a steel wire coil and a single one or two concentrically arranged coils may be embedded in the filler layer. The filler layer comprises plastic bonded granular material such as plastic and sand or an insulating material which may be made of an epoxy or a diphenyl polyester resin. The tube is advantageously made up in sections in which the inner layer is of greater axial elongation than the intermediate or outer layers and it may be abutted against another section and held to the other section by a surrounding sleeve having a central portion comprising inner and outer layers with an intermediate layer which fit in between the intermediate layers and outer layers of the adjacent sections and engage against the inner layer of the adjacent sections in sealing engagement with sealing rings disposed therebetween.

2 Claims, 6 Drawing Figures

REINFORCED TUBE OF PLASTIC AND A METHOD OF MANUFACTURING THE SAME

BACKGROUND OF THE INVENTION

Field of the Invention

This invention relates in general to the construction of tubular members or pipes and in particular to a new and useful reinforced tube of plastic and to a method of manufacturing reinforced plastic tubes.

Reinforced tubes of plastic of known construction are mostly designed as so-called sandwich tubes comprising a layer of plastic-bonded granulated filler material, for example, sand, between glass fiber-reinforced layers of plastic, by an appropriate orientation of the glass fiber reinforcement in the respective layers, the axial and/or radial resistance of such a tube may be varied. Experience has shown that tubes having a great resistance both to radial and axial stresses are relatively difficult to manufacture and, in particular, need much glass fiber reinforcement whereby they become expensive. This leads to considerable difficulties, particularly in the construction of tubes of medium diameter (for example, between 40 and 150 cm) which are to be buried in the ground, on which, in addition, high tightness requirements are imposed.

The present invention is directed to a tube of plastic which is adapted to resist high stresses both in the axial and the radial direction. For this purpose, in accordance with the invention, a tube of plastic is provided with at least one helical reinforcing insert which is wound coaxially of the tube axis. This insert may be made of a fiber-reinforced plastic or a metal. It may be placed, for example, in an intermediate layer which is provided between two glass fiber-reinforced plastic layers or, for example, in a layer which is provided radially outside the usual reinforcing layers and, for example, further supports only a thin covering layer or an insulating layer.

The method of manufacturing such a tube, also constituting the subject matter of the present invention, comprises producing a fiber-reinforced plastic layer and providing this layer, during its formation at the earliest, with a helically wound reinforcement. Thus, for example, in a rotating mold for the tube, the helical reinforcing insert (helix) is inserted before or after a fiber-reinforced layer is built up, whereupon the material necessary for embedding the insert or forming a further layer is brought in. The helically wound reinforcing insert could, however, also subsequently be slipped over or wound on a tubular body which has been produced by centrifuging in a hollow mold or winding on a core, whereupon the tube would be finished by applying further material, for example, by winding or attaching shell pieces. It may be advantageous to introduce the helical insert only after producing an outer fiber-reinforced layer, but one may proceed also in a manner such that the fiber reinforcement of an outer layer is introduced simultaneously with the helical insert and the material necessary for the layer formation, i.e. plastic and filter (for example, sand) is brought in only subsequently.

In case such a tube is used for conveying liquids having a relatively high temperature, for example, hot water, difficulties are frequently met which are due to the unequal thermal expansion of a steel helix and a glass fiber-reinforced plastic. If the steel helix is placed in the middle zone of the tube wall, it may prevent a free expansion of the inner layer of the wall to such an extent that undesirably high stresses are produced between this inner layer and the freely expanding outer layer of the tube wall. Such stresses lead to a separation of the layers or a rupture, particularly in the presence of additional compressive and/or bending stresses such as occur in buried tubes. A placing of the steel helix in the outermost layer of the tube cannot solve this problem either since for example with the burying of such a tube, unavoidable bending or shearing stresses between the steel helix and the glass fiber-reinforced plastic may also lead to a rupture of the tube.

The present invention makes it possible to avoid even such difficulties by providing a tube, and a method for manufacturing such a tube, where stresses leading to a rupture cannot occur. For this purpose, the inventive tube of plastic comprises at least one helical insert which surrounds the inner layer of plastic and is enveloped by a protective layer which is separated from an outer plastic layer by a thermally insulating filler material.

The tube may be manufactured in a particularly advantageous manner so that the helix is wound on an inner tube of glass fiber-reinforced plastic and covered by a protective layer and that, thereupon, a jacket tube of plastic is positioned in coaxial and radially spaced relationship thereto and the annular space thus produced between the inner tube and the jacket tube is filled with a setting plastic foam.

Due to the insulating layer provided between the helix and the jacket tube, stresses leading to rupture can not occur and the tube thus obtained is excellently suitable, even in buried state, for conveying liquids having increased temperatures.

Accordingly it is an object of the invention to provide an improved pipe or tube construction which comprises an inner tubular first layer of glass fiber-reinforced plastic, an outer tubular second layer of glass fiber-reinforced plastic disposed around said first layer and spaced radially outwardly therefrom, and an intermediate layer between said first and second layers and containing plastic and granular filler material bonded together and to said first and second layers and further including a reinforcing insert embedded in the intermediate filler layer which comprises a continuous coil wound around said first layer.

A further object of the invention is to provide a method of forming a tube or pipe which comprises rotating a mold and adding a plastic and fiber material thereto to form an outer layer, adding a plastic and granular material to the first layer to bond it to the first layer and before it is through positioning a coil in the mold into the filler layer and continuing to form the filler layer over the coil to embed the coil in the filler layer and thereafter adding another layer of fiber reinforced material to the filler layer and bonding it thereto.

A further object of the invention is to provide a plurality of individual pipe sections having inner and outer reinforced plastic layers with an intermediate filler layer and a coil embedded in one of said layers which is wound around the axis of said layers, and wherein the innermost layer is arranged to have a length longer than the outermost and intermediate layers so as to abut against a neck section of a cylinder construction and including a sleeve part engaged around the overhanging ends of the innermost layers and being sealed thereto and having an outer wall part extending over the outermost layers and being sealed thereto.

A further object of the invention is to provide a pipe construction which is simple in design, rugged in construction and economical to manufacture.

For an understanding of the principles of the invention, reference is made to the following description of typical embodiments thereof as illustrated in the accompanying drawings.

GENERAL DESCRIPTION OF THE PREFERRED EMBODIMENTS

Figure 1:
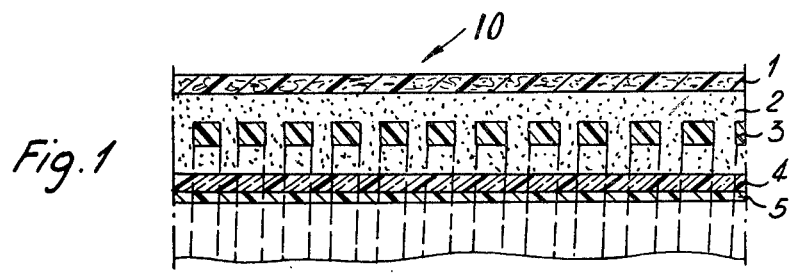
FIG. 1 is a partial axial sectional view of a tube constructed in accordance with the invention.

Referring to the drawings in particular the invention embodied therein in FIG. 1 comprises a pipe or tube generally designated 10 which is made up of a plurality of individual bonded together layers 1, 2, 4 and 5.

The outer layer 1 comprises the plastic material which is reinforced by fibers which for example are advantageously made up of short lengths. The layer 2 comprises an inner or intermediate layer which is a filler layer formed by a plastic bonded granular material which is bonded to the outer layer and to an inner layer 4 of glass fiber reinforced plastic. A cover layer 5 is bonded to the interior periphery of the inner layer 4 and it is made of a layer of plastic which may for example include a reinforcement which is made of glass fibers.

In accordance with the invention a wound coil or helix 3 is embedded in the intermediate layer 2. In the embodiment illustrated in FIG. 1 the coil 3 comprises a glass fiber-reinforced plastic material.

The tube of the type indicated in FIG. 1 is manufactured as follows:

First, reinforcement insert 3 is produced using an isophtalic ester resin and glass roving. The glass content may be approximately 60% by weight and the resin content approximately 40% by weight. The cross section of each coil of the insert 3 having the shape of a helical spring is rectangular. For a tube to be manufactured with an external diameter of 1000 mm and an internal diameter of 980 mm, the outer diameter of the insert is for example, 988 mm, the radial thickness of the spring wire 4 mm, the axial width of the springwire 5 mm and the axial spacing of the spring turns 3 mm.

Then, glass fiber pieces having a length, for example, of 50 mm and orthophtalic resin as plastic are fed into a rotating hollow mold to form outer layer 1 to a thickness of 1 mm. The glass content of this layer is advantageously about 50% by weight. Then, sand and orthophtalic resin are fed into the rotating mold up to an amount to form a filler layer 2 to a layer thickness of approximately 1 mm. Now, the formed layers are subjected to gelation at 80° C. Thereupon, the mold rotation is stopped and the prefabricated insert 3 is placed into the mold. The mold is put into rotation again and further sand and orthophtalic resin is fed in until the sand-resin layer 2 in which insert 3 is embedded attains a total thickness of about 7 mm. Thereafter, glass fiber pieces and orthophtalic resin are fed into the rotating hollow mold until the inner, reinforced, layer 4 attains a thickness of about 2 mm. Upon the gelation of this layer, a flexible cover layer 5 having a wall thickness of approximately 1 mm is formed by adding the plastic into the mold. Thereafter the tube is cured at about 120° C.

A tube thus formed and reinforced has been exposed to an internal water pressure test which showed a bursting limit of 40 kg/cm$^2$ for an axially non-loaded tube. Leakage of the tube appeared not sooner than at an axial elongation of 0.6%. As compared thereto, a reference tube having the same layer structure but no spring insert 3, showed a resistance to internal pressure of only 25 kg/cm$^2$ and a leakage already at a load of 10 kg/cm$^2$ which resulted in an axial elongation of 0.25%. An otherwise analogous tube which has been manufactured while using isophtalic resin instead of orthophtalic resin and, for the spring insert, epoxy resin instead of isophtalic resin, showed a bursting limit of 50 kg/cm$^2$ at 23° C. and of 40 kg/cm$^2$ at 100° C.

Figure 2:
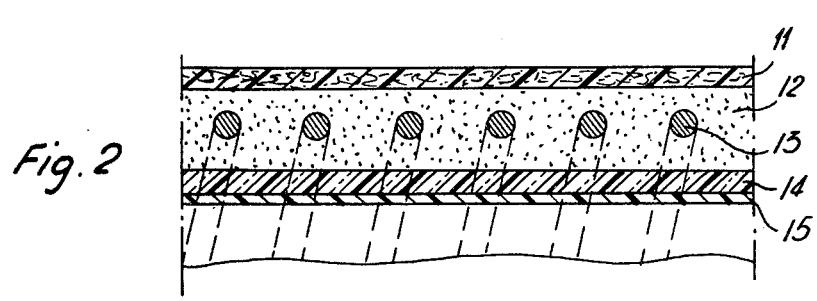
FIGS. 2 to 4 are views similar to FIG. 1 of other embodiments of the invention.

The tube shown in FIG. 2 comprises an outer glass fiber-reinforced plastic layer 11, a filler layer 12 which is formed by a plastic-bonded granular material and in which a helically wound steel wire insert 13 is embedded, an inner glass fiber-reinforced plastic layer 14, and an inner plastic cover layer 15. Such a tube may be manufactured, for example, as follows: a rotating hollow mold having an inner diameter of, for example, 500 mm, is supplied with 50 mm long glass fiber pieces (60 ends roving) along with isophtalic polyester resin. By means of an air stream and a suitably chosen rotational speed of the mold, it is made sure that the glass fiber pieces become embedded in plastic layer 11 with an all-side orientation, not only oriented in the circumferential direction. Upon attaining a layer thickness of approximately 1 mm, sand and isophtalic resin are supplied into the tube mold and that, first, also up to a layer thickness of approximately 1 mm. Now, gelation is effected with heat and then, the mold is stopped and steel wire insert 13 is placed in the mold. The outer diameter of this insert is, in this example, 496 mm while the wire diameter is 2 mm and the axial spacing of the turns is 10 mm. Subsequently, the mold is further rotated and sand and isophtalic resin is supplied until a total thickness of layer 12 of approximately 5 mm is obtained. Then, for forming reinforced layer 14, glass fiber pieces and isophtalic resin are supplied again, up to a layer thickness of about 2 mm; finally, vinyl polyester resin is supplied to form cover layer 15.

In a test with this tube, an axial strength of 240 kg/cm$^2$ has been found, with a breaking elongation of 0.8%. The stiffness of the tube (E·J/D$^3$) was 4000 H/m$^2$. The leakage test resulted in a leakage at an internal pressure of 16 kg/cm$^2$. With the use of hot water having a temperature of 100° C., a leakage appeared only at 20 kg/cm$^2$. The tensile strength of the steel wire of insert 13 was 130 kg/cm$^2$.

In an otherwise identically designed variant of the above described tube, a wire spring has been used with an axial turn spacing of 3 mm instead of 10 mm. This tube has been tested with natural gas and remained tight up to an internal pressure of 50 kg/cm$^2$.

Figure 3:
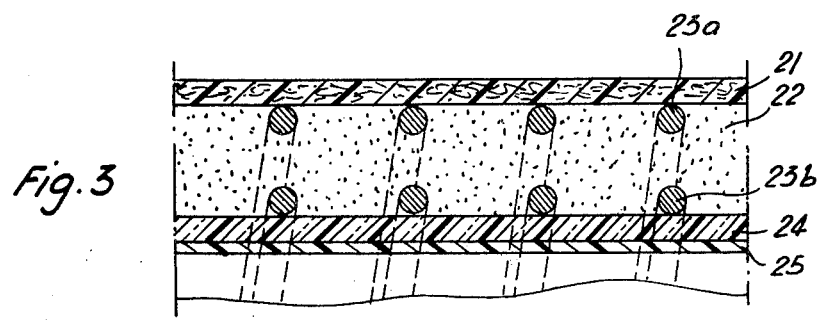

In the tube shown in FIG. 3, two steel wire springs 23a, 23b, which are positioned, radially spaced, one within the other, are embedded in a filler layer 22 which is provided between two glassfiber-reinforced layers 21 and 24. The tube is further provided with an inner cover layer 25. This tube may be manufactured, for example, as follows:

Into a rotating hollow mold having an internal diameter of, for example, 800 mm, glassfiber pieces and polyester resin are supplied for forming a layer 21. The thickness of the layer 21 may be 1 mm. After gelation, the hollow mold is stopped. Now, the first steel wire spring 23a having an outer diameter of 798 mm is introduced. The wire diameter may be 2 mm and the axial spacing of the turns 13 mm. Thereupon, said and polyester resin are supplied into the rotating mold, up to a layer thickness of about 14 mm, with a subsequent gelation. The hollow mold is then stopped and the second steel spring insert 23b having an outer diameter of 770 mm is introduced. The diameter of the wire may be 2 mm and the turn spacing 13 mm. With the mold rotating again some sand and resin are fed in until spring 23b is completely embedded in layer 22. Then, glass fiber pieces and polyester resin are supplied into the mold to form layer 24 with a thickness of approximately 2 mm. The subsequently applied cover layer is about 1 mm thick.

Such a tube has been tested with oil and under a pressure of 20 kg/cm$^2$, the tube remained tight. It resisted also an external water pressure of 8 kg/cm$^2$. In addition, the tube has shown excellent electrostatic properties which can be improved by a conducting connection of the two steel-wire inserts 23a, 23b. This may be done so that the individual tubes of a line are connected by means of sleeves which are conducting and electrically connect the steel wire inserts of adjacent tubes.

Figure 4:
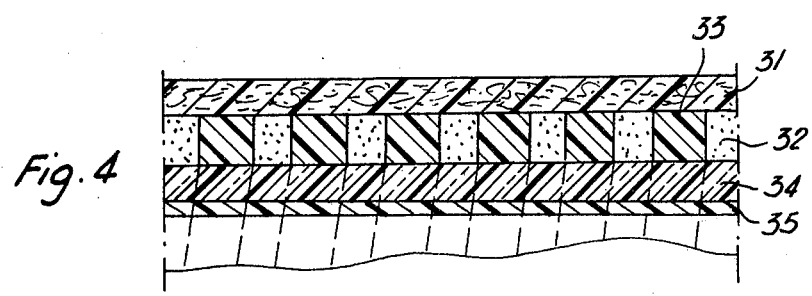

The tube shown in FIG. 4 comprises an outer plastic layer 31 which is reinforced with glass fibers (roving) oriented in the direction of the main axis, a helically wound insert 33 which is made of a glassfiber-reinforced plastic and embedded in a plastic-bonded layer 32 of granular material, an inner, glassfiber-reinforced plastic layer 34, and an inner cover layer 35. This tube may be manufactured, for example, as follows:

Into a tube mold having an inside diameter of, for example, 1000 mm, glass roving with an axial orientation relative to the main axis and, at the same time, the prefabricated insert 33 is placed in the mold. The radial thickness of the insert 33 is approximately 4 mm. While rotating the mold, polyester resin is fed in until the glass roving of layer 31 which is about 2 mm thick is completely impregnated and insert 33 is completely embedded by layer 32. Then, while forming the reinforced layer 34 up to a layer thickness of 2 mm, 50 mm long glass fiber pieces are fed in in addition to the resin, whereupon the inner cover layer is applied to a thickness of about 1 mm.

In tests with this tube, an axial strength of 900 kg/cm$^2$ and a breaking elongation of 1.5% in the axial direction have been determined. Under an internal water pressure of 10 kg/cm$^2$, the tube remained tight up to an axial elongation of k,2%.

It will be apparent from the foregoing that due to the provided measures, in particular, the helically wound insert, tubes can be manufactured having previously unattainably high strengths and a completely satisfactory tightness, both under internal pressure and axial load.

Preferable thicknesses for the inner layers exemplified by 4, 14 and 24 in FIGS. 1, 2 and 3, respectively, have been found to be between about 2 and 7 mm. Preferable thicknesses for the outer layers exemplified by 1, 11 and 21 of FIGS. 1, 2 and 3 respectively have been found to be between about 1 to 3 mm. When steel wire is used preferable diameters for the steel wire have been found to be about 2 mm and the spacing between turns of the coils should be at least 3 mm and preferably from about 5 to 13 mm. The spacing between the turns should also be at least greater than the thickness of the outer layer and should further be at least greater than twice the wire diameter.

It is quite understandable that in a manner analogous to what has been described above, tubes having another sequence, number and kind of layers, combined with the same or other helically wound reinforcing inserts may also be manufactured. In addition, it is also possible to manufacture these tubes not by centrifugation in a hollow mold (thus from the outside to the inside) but, for example, by applying the layers onto a mandrel from the inside to the outside, partly by spraying and partly by winding the individual layer materials. A combination of the two processes is also possible. It is further possible to provide two inserts of different materials, instead of two helical inserts of the same material (reinforced plastic or steel wire).

Figure 5:
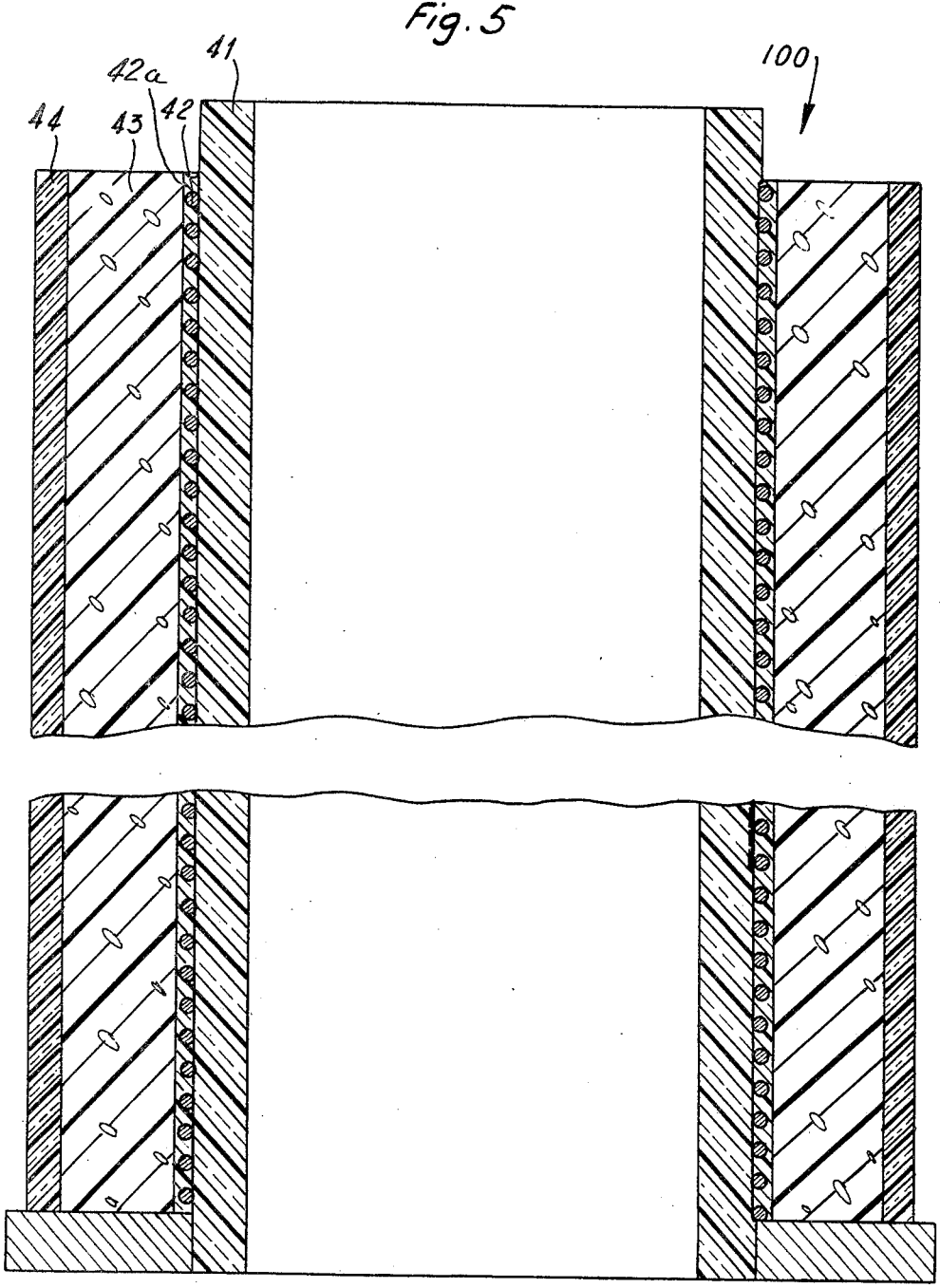
FIG. 5 is a full axial sectional view of still another embodiment of the invention.

The composite tube generally designated 100 shown in FIG. 5 comprises an inner tube 41 which is made of a glassfiber-reinforced plastic and surrounded by a steel helix or coil 42 which is embedded in plastic and covered by a protective layer of plastic 42a, a relatively thick filler layer 43 of insulating material surrounding the inner tube, and a jacket tube 44 which is made of a glassfiber-reinforced plastic and surrounds the filling layer. For manufacturing such a composite tube, the following steps, for example, are provided:

In a centrifugal casting process and with the use of a heat-resisting plastic, the inner tube 41 is manufactured, for example, with a diameter of 500 mm and a wall thickness of 7 mm. A winding process might also be used for manufacturing the inner tube. After the setting and removing from the mold, the steel helix 42 having, for example, a wire diameter of 2 mm, is wound on the inner tube with a turn spacing of about 5 mm. Then, a plastic primer putty is applied between the wire turns and subjected to gelation. The inner tube thus prepared is then coated with a thin plastic laminate layer having a high yield strength and temperature stability. Prior to the gelation of this plastic layer, a thin glassfiber mat is fixed thereto so that the outside of the now finished inner tube is formed by pure, non-impregnated, glass fibers. Further, while using the same process of centrifugal casting, a plastic tube is manufactured having, for example, a diameter of 600 mm and a wall thickness of 3 mm. Care is to be taken to obtain plastic-free glass fibers on the inside surface of this tube; at the same time, of course, this surface may comprise also glass fibers which are completely embedded in plastic. After the setting and removal from the mold, the two tubes are positioned coaxially one within the other, as shown in FIG. 5, where upon the annular space remaining therebetween and which contains plastic-free glass fibers, is filled with a setting plastic foam; the plastic foam unites the inner tube and the jacket tube into a composite tube of high stiffness.

It has been found that the described composite tube, while buried under an overburden of 5 to 6 m, suffers a deformation of less than 1%. Since the steel coil 42 is located in the middle zone of the tube wall, thus close to the neutral axis, the bending stresses of this location and, consequently, also the shearing stresses occurring between the steel helix and the plastic, are small. While conveying hot liquids therethrough, compressive stresses may appear in the inner tube, because the steel coil 42 limits the expansion of the inner plastic layer 41, some radial stresses may occur between the laminate of layers 43 and 44 embracing the helix and the inner plastic layer. Since, however, the laminate is very thin and the plastic has a greater flexibility at higher temperatures, these radial stresses are small and cannot lead to a rupture. The laminate prevents water penetrating from the exterior to the coil 42, which could cause a corrosion.

Figure 6:
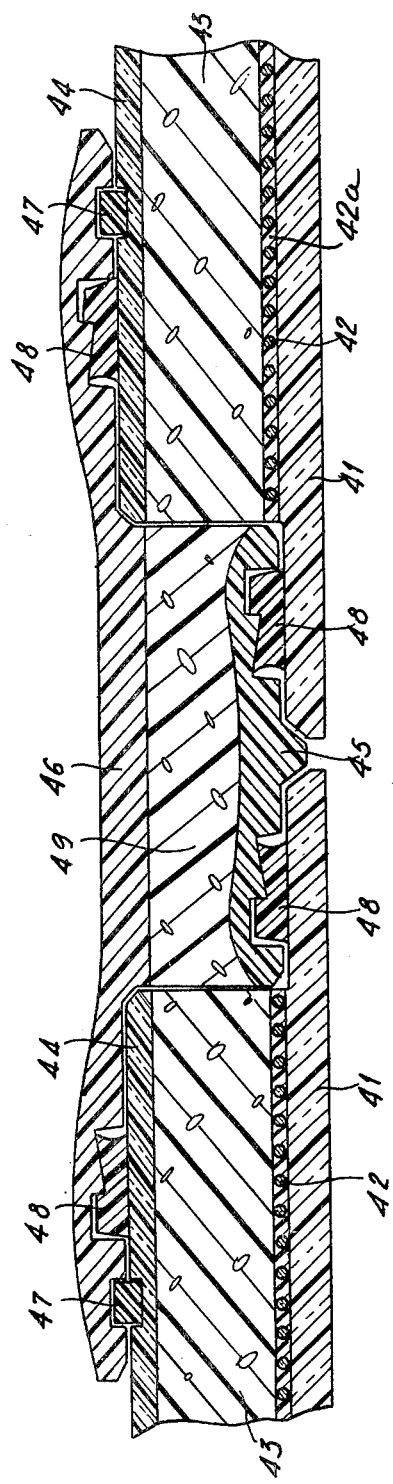
FIG. 6 is a partial axial sectional view of still another embodiment of the invention.

Since the tubes 100 can be manufactured only in predetermined lengths or sections, for laying a line, they must be coupled to each other. An example of such a coupling by which both the coil 42 and the filler 43 is protected against water penetrating from the inside or outside, is shown in FIG. 6. In the shown sections of the composite tubes, the respective elements of the tubes are designated correspondingly, i.e. the inner tube with 41, the steel coil with 42, the insulating layer with 43 and the jacket tube with 44. As may be seen in FIG. 6, the glassfiber-reinforced inner tube 41 extends beyond coil 42 and beyond tube layers 43, 44 which surround the coil at each end. At the joint of the two tube sections, the projecting portions of inner tubes 41, on the one hand, and the two jacket tubes 44, on the other hand, are connected to each other by a sleeve part 102 including inner and outer layers 45 and 46. In order to prevent an axial separation of the connected tube sections, safety rings 47 are provided which engage into grooves of jacket tube 44 and of outer sleeve part 46. Sealing rings 48 are provided which are received in recesses of outer sleeve part 46 located axially inwardly of each ring 47. As shown in the drawing, the two sleeve parts 45, 46 are of symmetrical design relative to the median plane of the joint and are united with each other by means of an intermediate layer 49 of filler or insulating material having a composition analogous to that of layer 43 between the tubes. Such a tube coupling makes it possible to assemble also axially stressed lines, for example, hot water conducting pipelines. It is advantageous to have short lengths of the glassfiber-reinforced cement of the inner layer or tube 41, 42a oriented, at least partly, in the circumferential direction and the reinforcement of the outer or jacket tube 44, 45 in the axial direction.

As heat resistant plastics for the filler layer 45, epoxy resins, diphenol polyester resins or vinyl ester resins have proved advantageous. The primer putty to be applied between the turns of the steel coil should also be heat resistant; in particular, it has to have a coefficient of thermal expansion as low as possible and only a small friction relative to the steel coil 42, for this purpose, advantageously, the primer putty is mixed with a great proportion of a suitable filler, such as powdered quartz or kaolin.

The protective layers 41 and 42a need not be heat resistant and advantageously, a glassfiber-reinforced plastic laminate is used and it is advisable to provide a glassfiber mat (not shown) as the reinforcement within. The plastic should become flexible under heat and have a breaking elongation, for example, of more than 3% at 90° C.

As mentioned, a steel wire coil is particularly suitable as the helical insert 42. In some cases, however, a coil made of a glassfiber-reinforced plastic could also be provided, as far as it is made with a relatively large glass content and a plastic which is particularly heat resistant.

While specific embodiments of the invention have been shown and described in detail to illustrate the application of the principles of the invention, it will be understood that the invention may be embodied otherwise without departing from such principles.

The embodiments of the invention in which an exclusive property or privilege is claimed are defined as follows:

1. A reinforced tube of plastic, comprising an inner tubular first layer of glass fiber reinforced plastic, an outer tubular second layer of glass fiber reinforced plastic disposed around said first layer and spaced radially outwardly therefrom, and an intermediate filler layer located between said first and second layers and containing plastic and granular filler material bonded together and to said first and second layers, and a reinforcing unstressed spring steel wire insert embedded in said intermediate filler layer and comprising a continuous coil wound around said first layer, said unstressed spring steel wire insert being of a diameter of about 2 mm, the spacing between turns of said coil being preferably between about 5 to 13 mm, the thickness of said inner tubular first layer being preferably between about 2 to 7 mm, and the thickness of said outer tubular second layer being preferably between about 1 to 3 mm, said spacing of the turns being thus at least greater than the thickness of said outer layer.

2. A reinforced tube of plastic according to claim 1, wherein said coil is arranged around said inner layer, a primer putty embedding said coil over said inner layer and containing a friction-reducing filler, and a protective layer of plastic laminate between said primer putty and said filler layer, said protective layer comprising a thermoflexible plastic having a breaking elongation of more than 3% at 90° C.

* * * * *